(12) United States Patent
Sun et al.

(10) Patent No.: US 12,335,340 B2
(45) Date of Patent: Jun. 17, 2025

(54) SCALABLE AUTONOMOUS STORAGE NETWORKS

(71) Applicant: Lemon Inc., Grand Cayman (KY)

(72) Inventors: Yan Sun, Los Angeles, CA (US); Peng Xu, Los Angeles, CA (US); Kyoungryun Bae, Los Angeles, CA (US)

(73) Assignee: Lemon Inc., Grand Cayman (KY)

( * ) Notice: Subject to any disclaimer, the term of this patent is extended or adjusted under 35 U.S.C. 154(b) by 0 days.

(21) Appl. No.: 18/397,944

(22) Filed: Dec. 27, 2023

(65) Prior Publication Data

US 2024/0171634 A1 May 23, 2024

(51) Int. Cl.
*G06F 15/16* (2006.01)
*H04L 47/12* (2022.01)
*H04L 67/1097* (2022.01)
*H04L 67/63* (2022.01)

(52) U.S. Cl.
CPC .......... *H04L 67/1097* (2013.01); *H04L 47/12* (2013.01); *H04L 67/63* (2022.05)

(58) Field of Classification Search
CPC ...... H04L 67/1097; H04L 67/63; H04L 47/12
See application file for complete search history.

(56) References Cited

U.S. PATENT DOCUMENTS

| 8,489,834 B1* | 7/2013 | Kumbhari | H04L 67/1097 711/162 |
| 2024/0171634 A1* | 5/2024 | Sun | H04L 67/63 |

* cited by examiner

*Primary Examiner* — Joseph R Maniwang
(74) *Attorney, Agent, or Firm* — Alleman Hall & Tuttle LLP

(57) ABSTRACT

A network storage system comprises a first application node, storage nodes, and a switch fabric comprising switches providing data paths. Each data path connects the first application node to a storage node of the plurality of storage nodes. The system further comprises a control plane software agent. The control plane software agent configures the network storage system to receive, via the first application node, a request for storing a file, select a first storage node, initialize a file identifier for the file based on a network topology of the switch fabric and the storage nodes, and store the file on the first storage node. The file identifier describes the first storage node, a storage location in the first storage node, and a first data path of the data paths. The first data path includes a first set of switches connecting the first application node to the first storage node.

20 Claims, 10 Drawing Sheets

800

```
┌─────────────────────────────────────────────────────────────────────┐
│  RECEIVING, VIA A FIRST APPLICATION NODE, A REQUEST FOR STORING A FILE 802 │
└─────────────────────────────────────────────────────────────────────┘
                                    ↓
┌─────────────────────────────────────────────────────────────────────┐
│  SELECTING A FIRST STORAGE NODE FROM A PLURALITY OF STORAGE NODES 804 │
│  ┌───────────────────────────────────────────────────────────────┐  │
│  │  THE FIRST STORAGE NODE IS SELECTED BASED ON ITS CONGESTION LEVEL │  │
│  └───────────────────────────────────────────────────────────────┘  │
└─────────────────────────────────────────────────────────────────────┘
                                    ↓
┌─────────────────────────────────────────────────────────────────────┐
│  INITIALIZING A FILE IDENTIFIER FOR THE FILE BASED ON A NETWORK TOPOLOGY │
│  OF A SWITCH FABRIC AND THE PLURALITY OF STORAGE NODES 806          │
│  ┌───────────────────────────────────────────────────────────────┐  │
│  │  FILE IDENTIFIER DESCRIBES THE FIRST STORAGE NODE, A STORAGE   │  │
│  │  LOCATION IN THE FIRST STORAGE NODE, AND A FIRST DATA PATH     │  │
│  │  CONNECTING THE FIRST APPLICATION NODE TO THE FIRST STORAGE NODE │  │
│  │  ┌─────────────────────────────────────────────────────────┐  │  │
│  │  │  FILE IDENTIFIER DESCRIBES ADDRESSES OF SWITCHES IN THE FIRST │  │  │
│  │  │  DATA PATH IN A HIERARCHICAL FORMAT                      │  │  │
│  │  └─────────────────────────────────────────────────────────┘  │  │
│  └───────────────────────────────────────────────────────────────┘  │
└─────────────────────────────────────────────────────────────────────┘
                                    ↓
┌─────────────────────────────────────────────────────────────────────┐
│  STORING THE FILE ON THE FIRST STORAGE NODE 808                     │
└─────────────────────────────────────────────────────────────────────┘
                                    ↓
┌─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─┐
│  RECEIVING, VIA THE FIRST APPLICATION NODE, A REQUEST FOR ACCESSING THE │
│                        STORED FILE 810                              │
└─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─┘
                                    ↓
┌─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─┐
│  RETRIEVING THE STORED FILE BASED ON THE FILE IDENTIFIER 812        │
│  ┌─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─┐  │
│  │  UPON DETERMINING THAT A CONGESTION LEVEL OF THE FIRST DATA PATH │  │
│  │  IS ABOVE A PREDETERMINED LEVEL, RETRIEVING THE STORED FILE USING A │  │
│  │                       SECOND DATA PATH                        │  │
│  └─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─┘  │
└─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─┘
```

FIG. 8

SCALABLE AUTONOMOUS STORAGE NETWORKS

BACKGROUND

A cloud-based data storage service is generally implemented with hardware and infrastructure physically located off-site from the user(s). The service provider maintains the equipment and infrastructure for providing the data storage service. Data centers can vary greatly in size and can be distributed across multiple geographic locations for redundancy. For example, the service provider can maintain data centers, each of which includes a facility for hosting a large number of interconnected servers and supporting infrastructure for providing computing and/or storage capacity. Examples of such equipment include processing systems, networking and storage systems, power systems, and environmental control systems.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

The present disclosure provides implementations of scalable autonomous storage networks. One aspect includes a network storage system, which comprises a first application node, a plurality of storage nodes, and a switch fabric comprising a plurality of switches providing a plurality of data paths. Each data path connects the first application node to a storage node of the plurality of storage nodes. The system further comprises a control plane software agent implemented on the network storage system. The control plane software agent configures the network storage system to receive, via the first application node, a request for storing a file, select a first storage node from the plurality of storage nodes, initialize a file identifier for the file based on a network topology of the switch fabric and the plurality of storage nodes, and store the file on the first storage node. The file identifier describes the first storage node, a storage location in the first storage node, and a first data path of the plurality of data paths. The first data path includes a first set of switches of the plurality of switches, the first set of switches connecting the first application node to the first storage node.

BRIEF DESCRIPTION OF THE DRAWINGS

FIG. 8 shows a flow chart illustrating an example method for providing an autonomous network storage solution, which can be implemented by the example autonomous storage network of FIG. 2.

DETAILED DESCRIPTION

Figure 1:
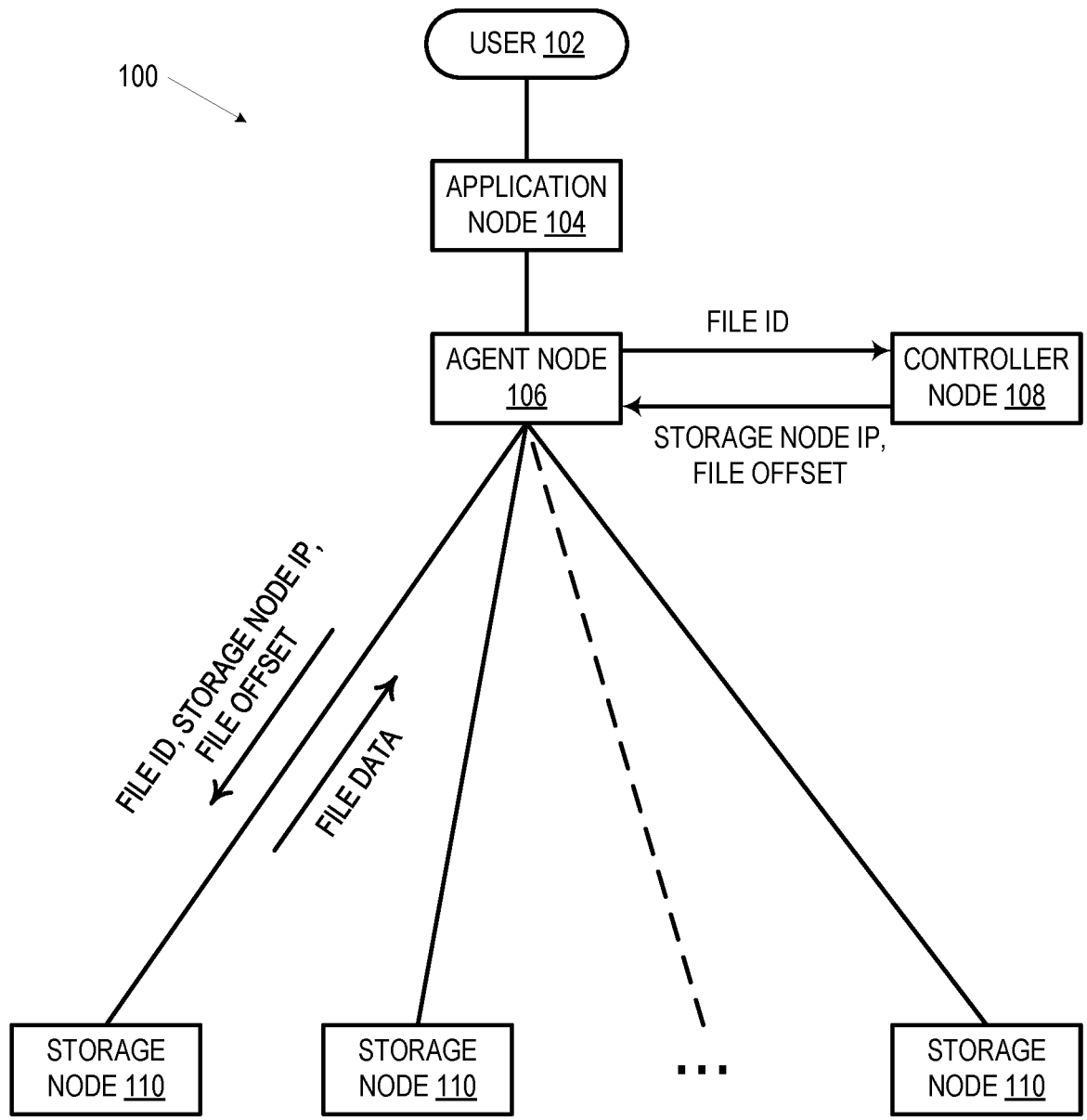
FIG. 1 shows a block diagram illustrating a storage cluster utilizing a centralized controller.

In a typical data center of a cloud data storage service, a conventional storage cluster and the computer networks providing access to the storage servers within the storage cluster generally use a centralized controller that has global storage information to perform read and write functions for data stored on the storage servers. FIG. 1 shows a block diagram depicting a conventional storage cluster 100 utilizing a such a centralized controller. The nodes depicted in FIG. 1 and other drawings of this disclosure are logical representations of equipment and hardware for implementing their respective functions. For example, the nodes can be implemented with a server or a cluster of servers that has the computing and/or storage capabilities for carrying out the nodes' respective functions.

A user 102 can use the conventional storage cluster 100 by accessing an application node 104 for requesting the performance of a data storage function. For example, the user 102 may request a read function on a given data file stored on the conventional storage cluster 100. The application node 104 in turn sends a request to an agent node 106 to carry out the request. The agent node 106 sends a query to a controller node 108. In some cases, the controller node 108 is implemented as a controller server cluster, and queries are directed to a given controller server (which can be determined, for example, using a load balancer).

In the depicted system, the query includes a file identifier (file ID) for identifying the file on which the requested read function is to be performed. The controller node 108 has the global storage information and can map the file ID to the location where the file is stored. For example, the controller node 108 uses information in the query to find and return a storage server internet protocol (IP) address and file location offset to the agent node 106, directing it to the storage server (depicted as storage node 110 in FIG. 1) on which the file is stored. The agent node 106 can then utilize such information to retrieve the file to perform the requested read function. A write process can be performed similarly, where the centralized controller node 108 checks for available space in the storage nodes 110 and determines which storage server to store the file that is to be written. Mapping tables are then updated across all controller servers of the controller node 108.

The conventional storage cluster 100 implemented in FIG. 1 suffers from several issues. As the conventional storage cluster 100 utilizes a single logical controller node 108, the system lacks the ability to properly scale. For example, as each controller server within the controller node 108 needs to store all the mapping information for all file IDs and their file location, scaling to a larger system becomes infeasible at a certain point. Another issue is that such implementations of a storage service often fail to meet high dynamic environmental requirements. For example, when file data is stored on a storage server, migration of the file data to another server is difficult since the method and timing of performing the migration depends on synchronization with the controller node 108.

In view of the observations above, examples of autonomous storage networks without a centralized controller are disclosed herein. In some implementations, a distributed storage solution is implemented without a centralized controller node/server cluster. Instead, a combined network-storage co-design is implemented using a switch fabric to provide one or more tiers of network switches (e.g., routers) connecting storage servers and application servers. File manipulation is performed with globally unique file IDs that can be dynamically assigned using a hierarchical format based on the network topology. For example, a file ID can be based on an IP subnet in a hierarchical format to provide the location of the stored file. The switches in the network can also function as a storage information cache and provide various information to the application nodes. As such, mapping information can be stored in the application nodes, the storage nodes, and the switches, eliminating the need for a centralized controller. The addition of a new application node can be performed by having the new application node read information from the switches. The addition of a new storage node to the storage network can be performed by having the new storage node broadcast its information to the components of the storage network and write its availability information on the switches.

Figure 2:
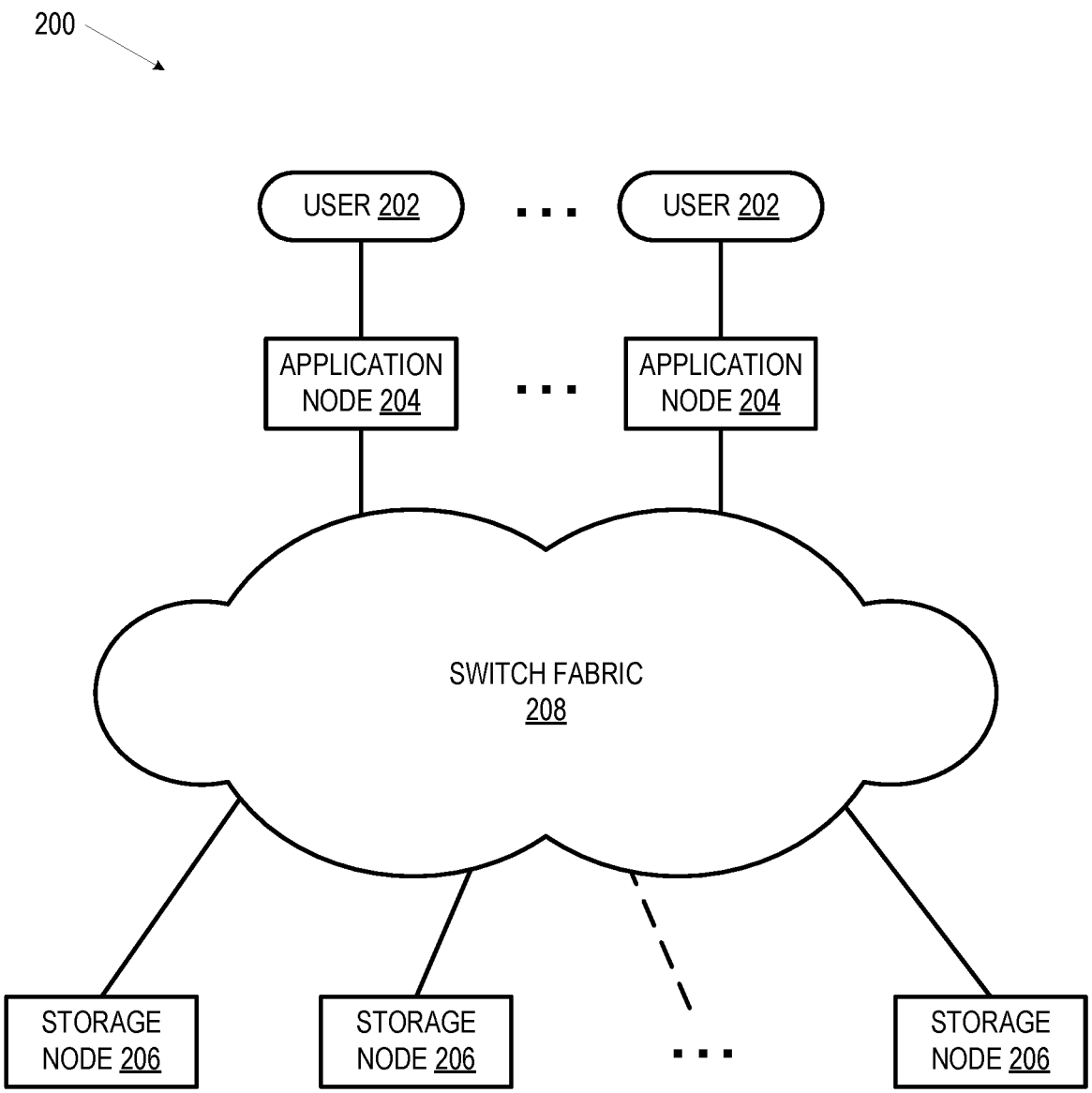
FIG. 2 shows a block diagram illustrating an example autonomous storage network of a data center.

Turning now to the drawings, examples of autonomous architectures for scalable storage networks are provided in further detail. FIG. 2 shows a block diagram illustrating an example autonomous storage network 200 of a data center. In general, the data center may be one of many distributed network data centers providing an operating environment for services provided to users 202 by a service provider. Users 202 can be individuals and/or collective entities, such as enterprises and governments. The data center may host equipment and supporting infrastructure for implementing the various components of the example storage network 200. In addition to data center implementations, the techniques described herein can be applied to computer networks and other computing environments generally.

In the depicted example of FIG. 2, the storage network 200 includes application nodes 204 and storage nodes 206 interconnected via a switch fabric 208. FIG. 2 depicts an example storage network 200 with multiple application nodes 202 and storage nodes 204. Any number of application nodes, storage nodes, and/or switches can be implemented. For example, the example storage network 200 can be implemented to include only one application node. The components of the example storage network 200 can be physically implemented in various ways. For example, each application and storage node may be implemented with a set of servers, forming various logical server groups. The servers can be physical servers, virtual machines running on physical servers, or combinations thereof. The switch fabric 208 can be implemented using a plurality of switches that provide a network topology interconnecting the application nodes 204 and the storage nodes 206 through a plurality of data paths. A switch, or router, is a device in a network that connects other devices together by routing or forwarding network traffic between devices according to network protocols such as Transfer Network Protocol/Internet Protocol (TCP/IP), User Datagram Protocol (UDP), etc. Different types of network topologies and configurations can be implemented. Examples of different configurations can be found in FIGS. 3 and 6 of the present disclosure.

To implement an autonomous architecture, the example storage network 200 is implemented without a centralized controller. Instead, information is stored in and utilized by the application nodes 204, the storage nodes 206, and the switches that compose the switch fabric 208 to perform various functions. In some implementations, an autonomous storage network architecture includes the use of a control plane software agent that configures the network storage system to perform the various functions described herein. For example, upon receiving a request for storing/writing a file, an application node 204 can probe multiple candidate storage nodes to determine where to store the file. In some implementations, information stored by the application nodes 204, the storage nodes 206, and the switches can be used to determine the list of candidate storage nodes. The information can also be provided by the components themselves. Different types of information, including information describing congestion levels of the data paths within the switch fabric 208 and the storage nodes 206, can be used to determine candidate storage nodes. Other processes for determining may be utilized to determine the storage node 206 where the file will be stored.

Once a storage node 206 is selected (e.g., from the list of candidate storage nodes), the application node 204 initializes a globally unique file ID for the file to be stored. As can readily be appreciated, file IDs may be used internally within the storage network and not exposed otherwise. Requests from a user can be translated internally to implement the user of globally unique file IDs, for example, by a proxy server. Various formats can be used to generate the globally unique file ID. In some implementations, the file ID is generated based on the IP subnet of the selected storage node while avoiding existing file IDs in that subnet. The file ID can be initialized based on a network topology of the switch fabric 208 and the storage nodes 206. For example, a hierarchical format describing the switches (e.g., IP addresses of the switches) in the networking topology corresponding to a data path through the switch fabric 208 that connects the application node 204 and the selected storage node. In some implementations, the file ID includes information describing (i.e., indicating) the selected storage node, the location in the selected storage node in which the file will be stored (e.g., file offset), and a data path through the switch fabric 208 that connects the application node 204 to the selected storage node. The file can then be stored in the selected storage node. As the file ID contains information describing its location, application nodes 204 may access the stored file without the use of a centralized controller.

A discovery schema in which a new application node connects to the storage network 200 can be implemented using stored information within the application nodes 204, the storage nodes 206, and the switches without a centralized controller. When the new application node connects to the storage network 200, the new application node discovers all the storage nodes in the network so that it can properly perform its functions in handling requests from the users 202. A tenancy scheme can be implemented to maintain the connection between the application nodes, the network path, and the storage nodes. The scheme includes the new application node sending query requests to all storage nodes to request a quote. The storage nodes reply to the service offer based on its running condition (e.g., quality-of-service (QoS), remaining storage space, etc.). Based on the offers, the new application node sends confirmation to the storage node responses with a leasing request or a denial of the offer. The tenancy can be time-limited such that it is to be renewed periodically so that QoS can be refreshed and adjusted in a timely manner.

In some implementations, the example storage network 200 implements a metadata recovery schema. In the event that an application node 204 loses its metadata, the metadata recovery schema can be implemented by the application node 204 to recover its metadata from the system. In some implementations, the metadata recovery schema includes having each application node have its identifier (e.g., APP_ID) associated with all file data that it owns such that its data is written together with its identifier into the respective storage node 206 during operations. When an application node 204 loses its meta data, it can generate a request that is broadcast to all storage nodes 206. Each storage node 206 is in charge of finding all file data that it stores belonging to the identifier of the requesting application node. The metadata info is replied back to the requesting application. In some implementations, application node identifier authentication is involved to guarantee data security.

Figure 3:
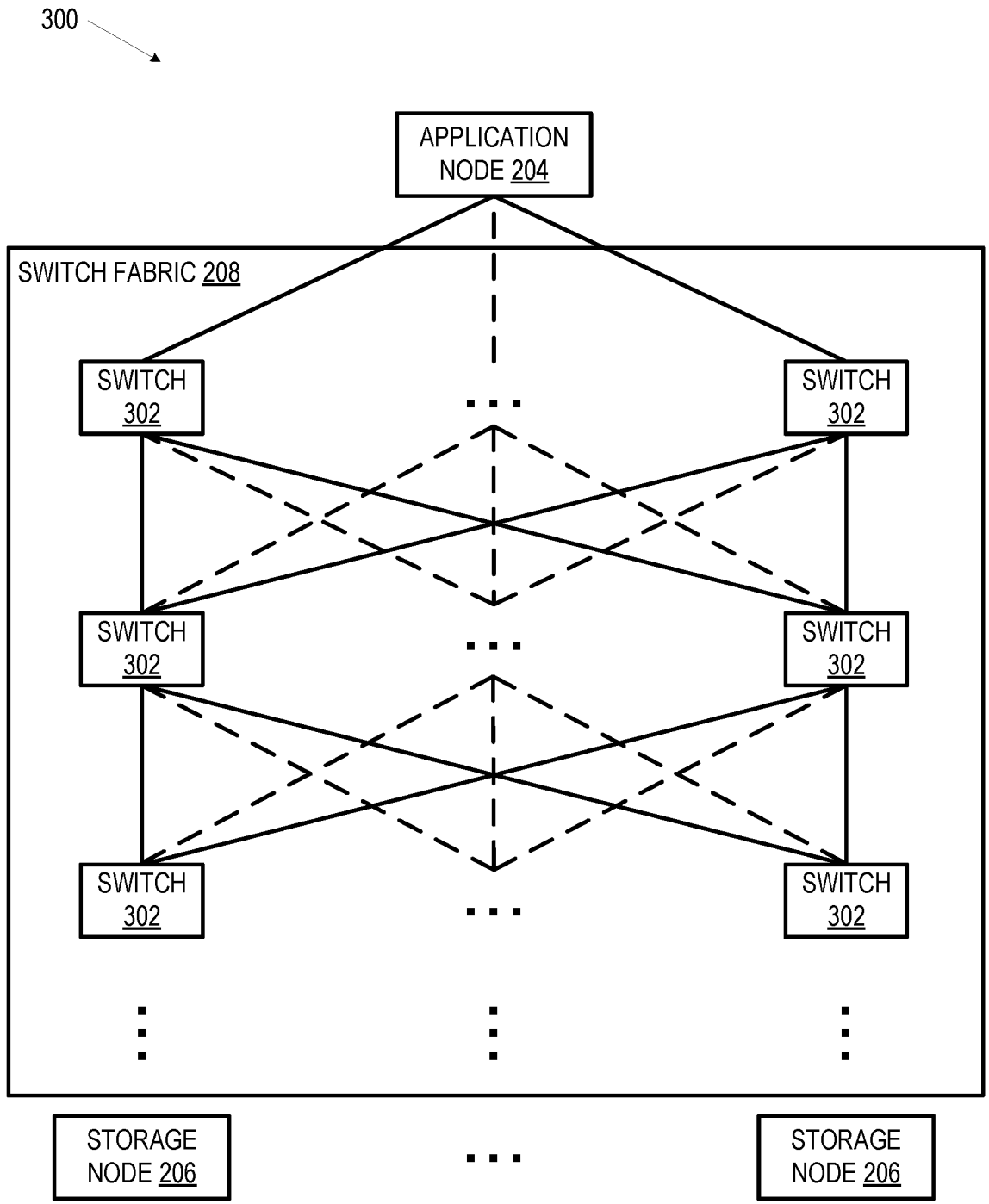
FIG. 3 shows a block diagram illustrating an example switch fabric architecture connecting an application node to a plurality of storage nodes, which can be implemented by the example autonomous storage network of FIG. 2.

FIG. 3 shows a block diagram illustrating an example storage network 300 with a switch fabric architecture connecting an application node 204 to a plurality of storage nodes 206. The example switch fabric architecture illustrates one configuration of switches 302 in a switch fabric 208, which can, for example, be implemented as the switch fabric of FIG. 2. Although FIG. 3 illustrates a network with a single application node 204, multiple application nodes 204 may be implemented, such as in the system depicted in FIG. 2.

Switch fabrics can be implemented using many different configurations that provide various network topologies, each with its own advantages and disadvantages. For example, the configuration can include different numbers of tiers of interconnected switches 302. In the depicted example, the switch fabric 304 includes at least three organized levels of switches 302. Each level of switches 302 is fully connected to its adjacent level(s) and/or to the application node 204 or the storage nodes 206. More or fewer levels can be implemented. In the depicted example, the switch fabric 208 is configured to provide full connectivity between adjacent levels. Each level may have any number of switches, subject to physical limitations. Interconnectivity between components is depicted with solid lines, and potential interconnectivity with potential components is depicted with dashed lines. Switches 302 of any level can communicate with any storage node 206 and any application node 204. Furthermore, such a configuration provides multiple data paths from the application node 204 to any given storage node 206. In a typical operation, data flow between the application node 204 and a storage node 206 is typically forwarded from the source to the destination along a single data path through the switches 302 of the switch fabric 304.

As described in the sections above, implementations of an autonomous storage network without a centralized controller can include the use of globally unique file IDs for performing various functions associated with a given file. In some implementations, the file ID is assigned by network topology in a hierarchical format. In further implementations, the file ID for a given file is initialized based on the storage node 206 or storage server's IP address where the file will be written.

The file ID for a given file can include information describing a data path from an application node 204 to the storage node on which the file is stored. For example, the file ID can describe the switches 302 that make up said data path. In some implementations, the file ID has several levels, and each level corresponds to one switch level in the networking topology. For example, a four-level file ID can be implemented as "0x1111222233334444," where the 0x1111, 0x2222, 0x3333, and 0x4444 are used as keys to search downward (from the application node 204 to the storage node 206). The file ID can be divided into multiple sections and each section is used as an index for searching the next level. In further implementations, the last level is used to distinguish from other file IDs in the same storage node. For example, the penultimate level may be information describing the storage node on which the file is stored, and the last level may be information describing an offset in said storage node. Various other formatting can be implemented.

Figure 4:
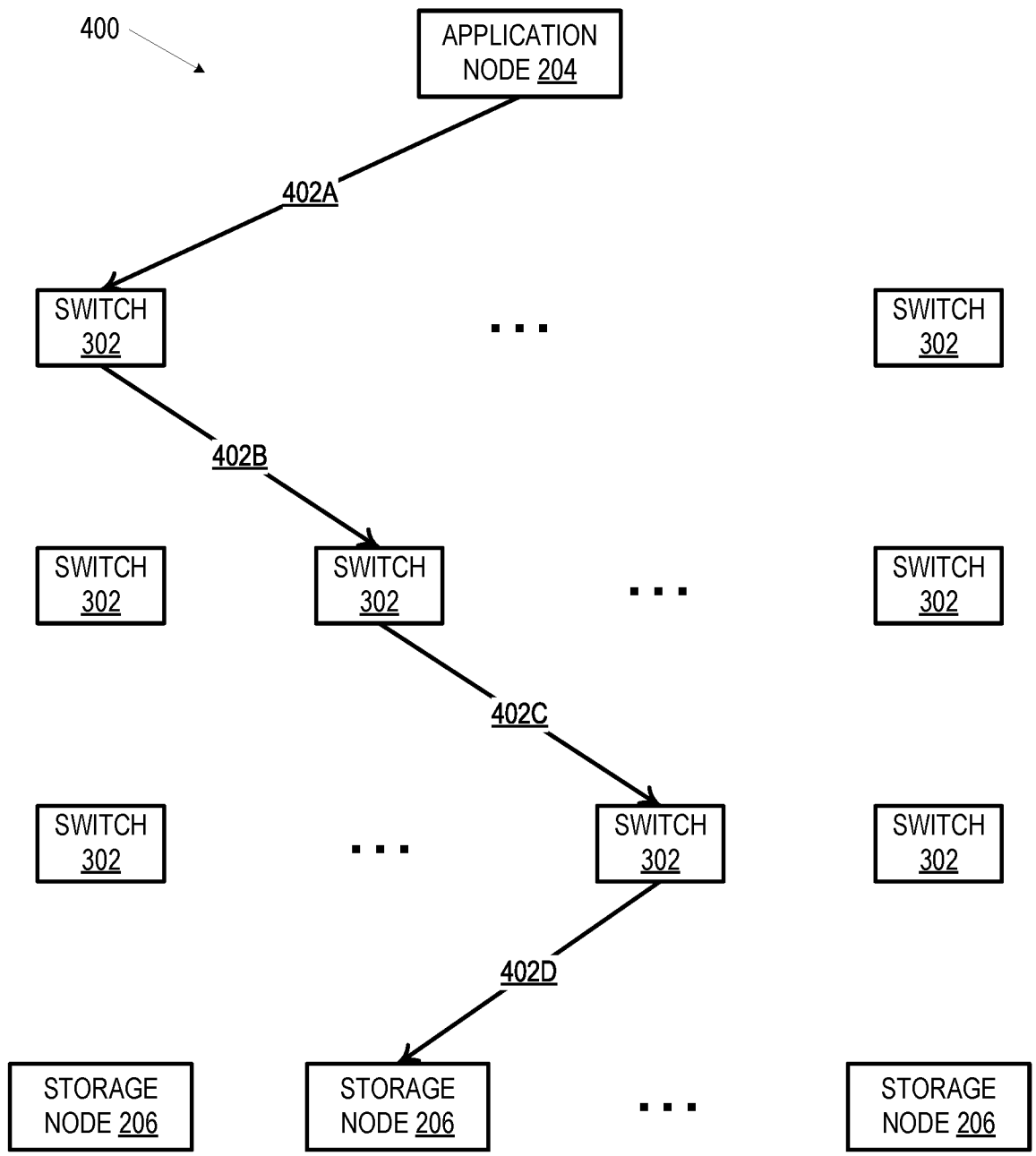
FIG. 4 shows a block diagram illustrating an example switch fabric architecture providing a full mesh network in a bipartite graph configuration, which can be implemented by the example autonomous storage network of FIG. 2.

FIG. 4 shows a block diagram illustrating an example storage network 400 with a data path provided by a switch fabric connecting an application node 204 to a storage node 206. As shown, the application node 204 traverses a data path through a series of hops 402A, 402B, 402C, 402D through a series of switches 302 before reaching a storage node 206. The data path is one of a plurality of data paths provided by a switch fabric composed of the switches. As described in the sections above, traversal of the switches 302 through the data path can be performed using information in the file ID of the file on which a requested operation is to be performed. For example, a four-level file ID formatting can be implemented where each section of the file ID provides a search key for finding the next switch 302 in the data path (e.g., the first section of the file ID can be an IP address or another identifier of the switch at the end of hop 402A, the second section of the file ID can be for the switch at the end of hop 402B, and so on).

Each switch 302 within the graph formed by the switch fabric can be implemented to store and be searchable via a single value. In some implementations, each switch 302 stores a range of values. Various mechanisms and schemes can be implemented to increase performance of traversing the switch fabric in the storage network. For example, upon determining that a data path described in the file ID is congested (e.g., based on flow control information from the storage node), a network congestion control algorithm can be implemented to probe other data paths. In some implementations, each switch 302 can have its neighbors' searching information.

Figure 5:
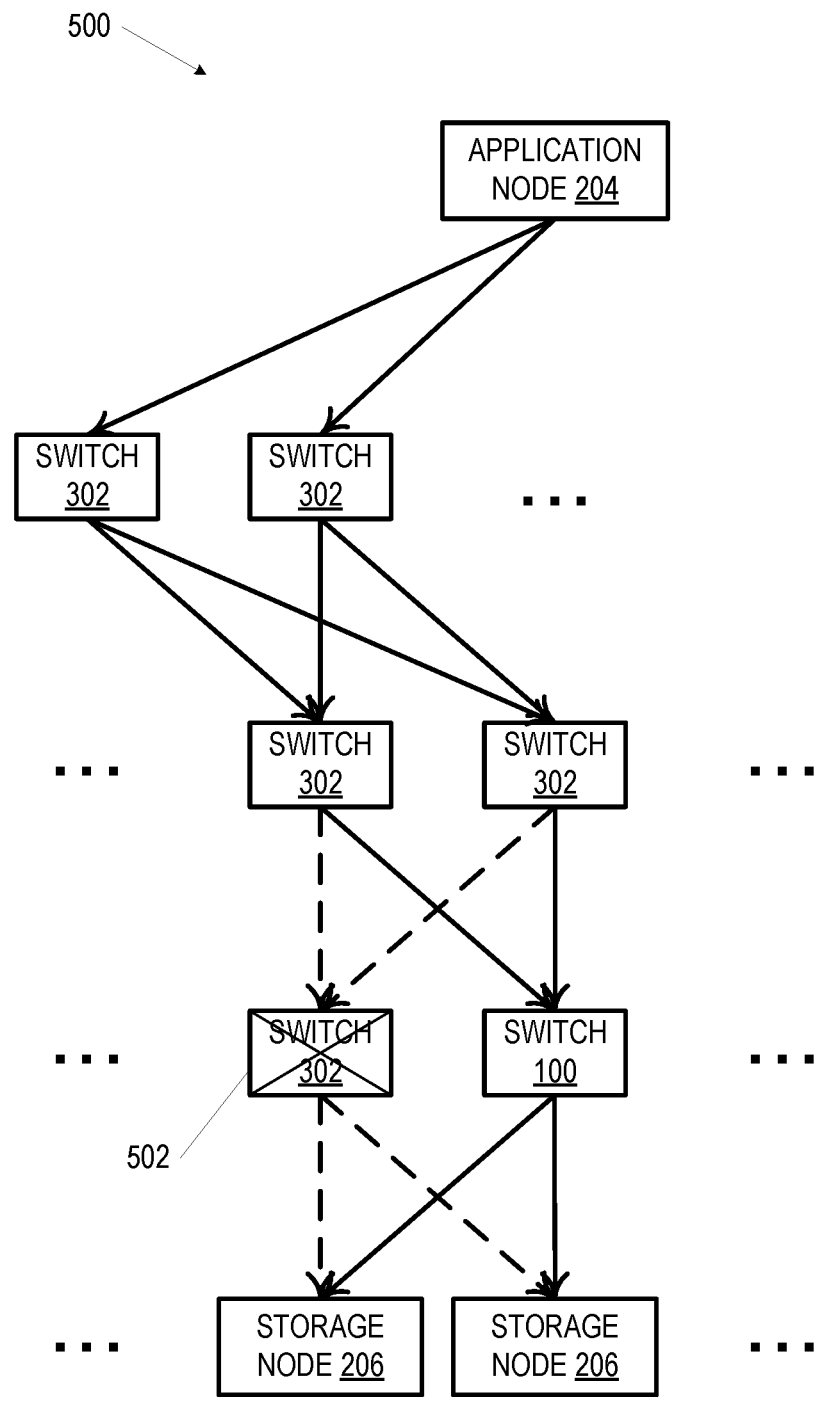
FIG. 5 shows a block diagram illustrating an example data path provided by a switch fabric connecting an application node to a storage node, which can be implemented by the example autonomous storage network of FIG. 2.

FIG. 5 shows a block diagram illustrating an example storage network 500 with redundant data paths provided by a switch fabric connecting an application node 204 to a storage node 206. The redundant data paths provide, for a given search key, at least two possible components for the next hop within the data paths. Such implementations can address the single point-of-failure-issue. For example, in the depicted example, failed switch 502 is a part of the data path that the application node 204 is searching, and possible links involving the failed switch 502 are unable to function (depicted with dashed lines). Without redundant data paths provided by neighboring nodes containing the same searching information, the entire data path may fail due to failure of a single switch 502 in the data path. As depicted, dashed lines show active connections, and the resulting data path(s) allow the application node 204 to reach the intended storage node 206 despite a failed switch 502 in the original data path.

Referring back to FIG. 3, the switch fabric 208 shown is configured to provide full connectivity between adjacent levels of switches. Such a configuration provides multiple data paths from the application node 204 to any given storage node 206. In addition to the increase bandwidth provided by such multiple data paths, another advantage includes redundancy to accommodate for failure rates. In a large-scale switch fabric, failure rates are often significant, even if single component failure rates are small in comparison. As such, multiple available data paths to any single given storage node 206 can be advantageous.

Figure 6:
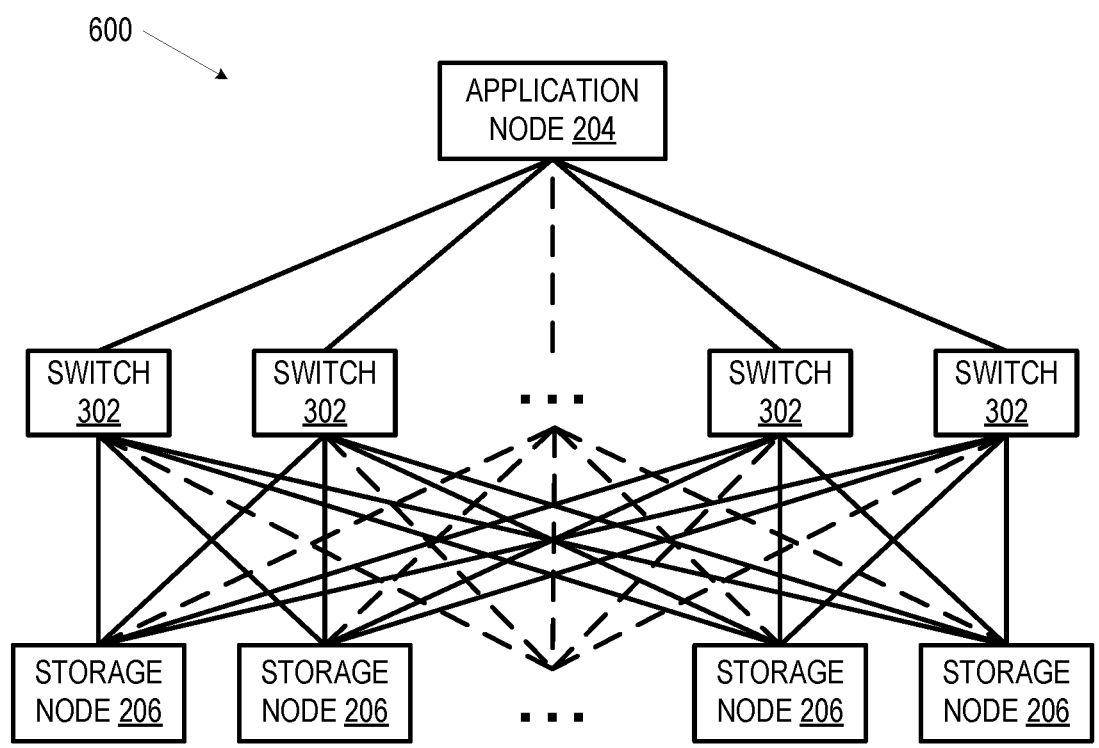
FIG. 6 shows a block diagram illustrating example redundant data paths provided by a switch fabric connecting an application node to a storage node, which can be implemented by the example autonomous storage network of FIG. 2.

Different configurations can provide different advantages depending on the use case. In some implementations, the switch fabric 208, the application node 204, and the storage nodes 206 can be configured and arranged in a way such that the distance between the application node 204 and the storage nodes 206 are minimized. FIG. 6 shows a block diagram illustrating an example storage network 600 with a switch fabric architecture providing a full mesh network in a bipartite graph configuration. As shown, there is a single level of switches 302. Each switch 302 is connected to every storage node 206 and application node 204. In such a configuration, there is only a single switch 302 in any given data path from the application node 204 to any of the storage nodes 206. Furthermore, as the switches 302 are not connected to each other, any failure of a switch 302 will likely be independent of another switch 302.

An application node 204 can be implemented to monitor its own read/write QoS to different storage nodes on different paths upon determining that a single path performance is poor. For example, packet lost, long round-trip time (RTT), or low bandwidth can indicate that a given path is congested. In response the application node may probe a new path with better quality and replace the congested path. If all the data paths have poor performance at the same time, that means congestion is likely due to a device failure. To determine the source of the congestion (e.g., whether congestion is due to a middle switch 302 or a storage node 206), flow control information from the storage node 206 can be used to detect whether the congestion occurs at the endpoint. If congestion occurs in the middle network switches, the application node 204 can first avoid congestion by using a network congestion control algorithm to probe other possible non-congested paths. If the storage node's receiving buffer is full, it can request senders to reduce or stop sending by using a flow control algorithm. For example, the storage node 206 can stop sending acknowledgment packets back to stop senders from continuing to send. In some implementations, the storage node 206 sends a notification to the senders with a request to stop sending.

As described in the sections above, a distributed storage system without a centralized controller can be implemented with components storing information such that an application node can make determinations related to operations requested upon it by a user. For example, various types of information can be stored in switches and storage nodes. In some implementations, information describing congestion levels of data paths, switches, and/or storage nodes are stored and provided to the application node. Congestion levels can provide information for the application node to determine, for example, which storage node to use for a write operation. Another determination that can be made using such information includes determining when and how to perform a migration process for migrating a file to another storage node due to congested data traffic.

Figure 7:
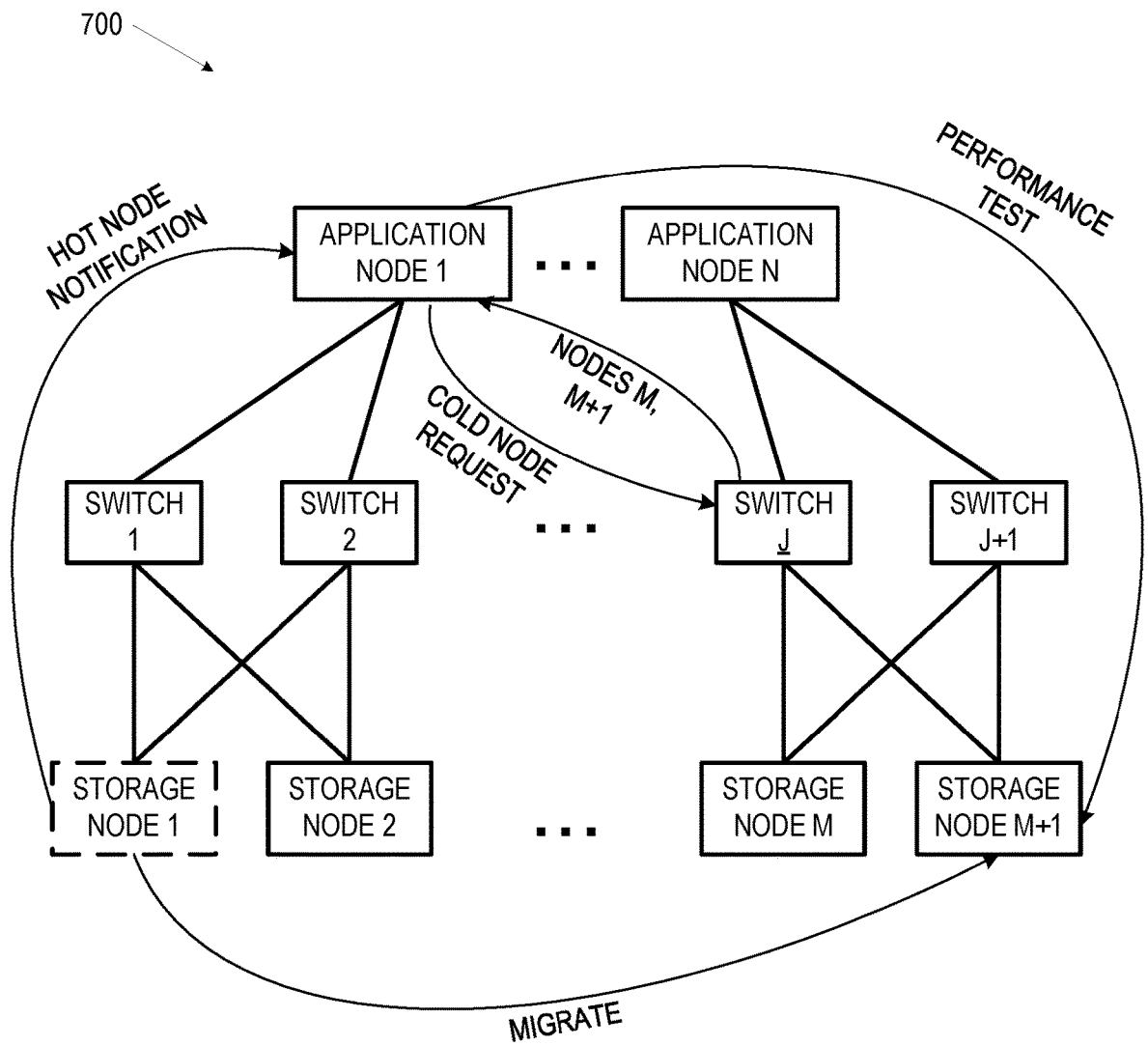
FIG. 7 shows a block diagram illustrating a data flow of an example migration process for a stored file, which can be implemented by the example autonomous storage network of FIG. 2.

FIG. 7 shows a block diagram illustrating an example storage network 700 with a depicted data flow for a migration process of a stored file. The depicted example network 700 includes a plurality of application nodes 1 through N interconnected with storage nodes 1 through M+1 via a plurality of data paths provided by a plurality of switches 1 through J+1. N, M, and J can be any positive integer number. For ease of illustration, not every connection is depicted. Furthermore, various switch fabric configurations can be implemented in such systems.

Storage nodes can record their own congestion level (which can also be referred to as their "hot" level). If a storage node's hot level exceeds a predetermined threshold, it can send a notification with its hot level to the application node or nodes that contribute most to its congestion or hot level. In the depicted example network 700, storage node 1 has a hot level past a predetermined threshold level. Accordingly, a hot node notification is sent to application node 1. The application node 1 can then send storage node probe requests to the cold storage nodes or broadcast probe information. In some implementations, the storage nodes send their busy/hot level to the switches, and the switches records/caches the storage nodes' information, including usage level and hot level. In the depicted example, a cold node request is sent to switch J. Switch J can be implemented to store information describing congestion levels of connected components (e.g., information describing hot levels of storage nodes connected to switch J). The stored information on the switches can be provided to the requesting application node. In the depicted example, storage nodes M and M+1 are cold, and such information is provided to application node 1 by switch J.

The application node can select one or more storage nodes from a list of candidates and send probe packets to the selected storage node(s) to test network performance (e.g., RTT). The list of candidate storage nodes can be generated in various ways. For example, the list of candidate storage nodes can be generated based on congestion levels of the storage nodes. The storage node selected from the migration process can be selected in various ways. In some implementations, the application node sends a read/write performance test. In the depicted example, application node 1 selects storage node M+1 from the list of candidate storage nodes provided by switch J. Application node 1 then sends a performance test to storage node M+1. From the testing results, the application node can select a storage node and migrate data from the hot storage node to the selected cold storage node. In some implementations, the data is copied and kept on both storage nodes.

When a file is migrated to a different subnet under a storage node, such as a different top-of-rack (TOR) switch, the file ID associated with the migrated file can be changed accordingly. In such cases, application nodes and/or other components that have said file's description can receive notification by the storage node and update the mapping between the File ID and storage IP/offset accordingly.

FIG. 8 shows a flow chart illustrating an example method 800 for providing an autonomous network storage solution. At step 802, the method 800 includes receiving, via a first application node, a request for storing a file. The request can be made by a user of the storage network. For example, a user can access the storage network through a set of application programming interfaces that provides the user with the tools to interface with the first application node.

At step 804, the method 800 includes selecting a first storage node from a plurality of storage nodes. In some implementations, the first storage node is selected based on its congestion level. Congestion level of the first storage node can be determined in various ways. For example, the plurality of switches store information describing congestion levels of the plurality of data paths and the plurality of storage nodes. In some implementations, for each of the plurality of storage nodes, a congestion level of the storage node is recorded on a respective set of switches of the plurality of switches, the respective set of switches connected to the storage node. The first storage node may be selected based on other criteria. In some implementations, the application node expects the file to be highly accessed. In such cases, the application node can prioritize storage of the file to a cold storage node through a cold data path.

At step 806, the method 800 includes initializing a file identifier for the file based on a network topology of a switch fabric and the plurality of storage nodes. In some implementations, the file identifier describes the first storage node, a storage location in the first storage node, and a first data path connecting the first application node to the first storage node. The first data path can include a first set of switches that connect the first application node to the first storage node. In some implementations, the file identifier describes addresses of the first set of switches in a hierarchical format. For example, the file identifier formatting can be implemented where each section of the file identifier provides a search key for finding the next switch in the data path.

At step 808, the method 800 includes storing the file on the first storage node. At step 810, the method 800 optionally includes receiving, via the first application node, a request for accessing the stored file. At step 812, the method 800 optionally includes retrieving the store file based on the file identifier. In some implementations, upon determining that a congestion level of the first data path is above a predetermined level, the method 800 includes retrieving the stored file using a second data path. The second data path can be determined in various ways. For example, the method 800 can include probing a set of candidate data paths from the plurality of data paths, and the second data path is selected from the list of candidate data paths based on a congestion level of the second data path. The list of candidate data paths can be provided in various ways, including based on congestion information stored on the plurality of switches. In some implementations, a congestion control algorithm is performed to probe for the second data path. Upon determining that the congestion level of the first data path is below the predetermined level, then the stored file can be retrieved using the first data path.

Figure 9:
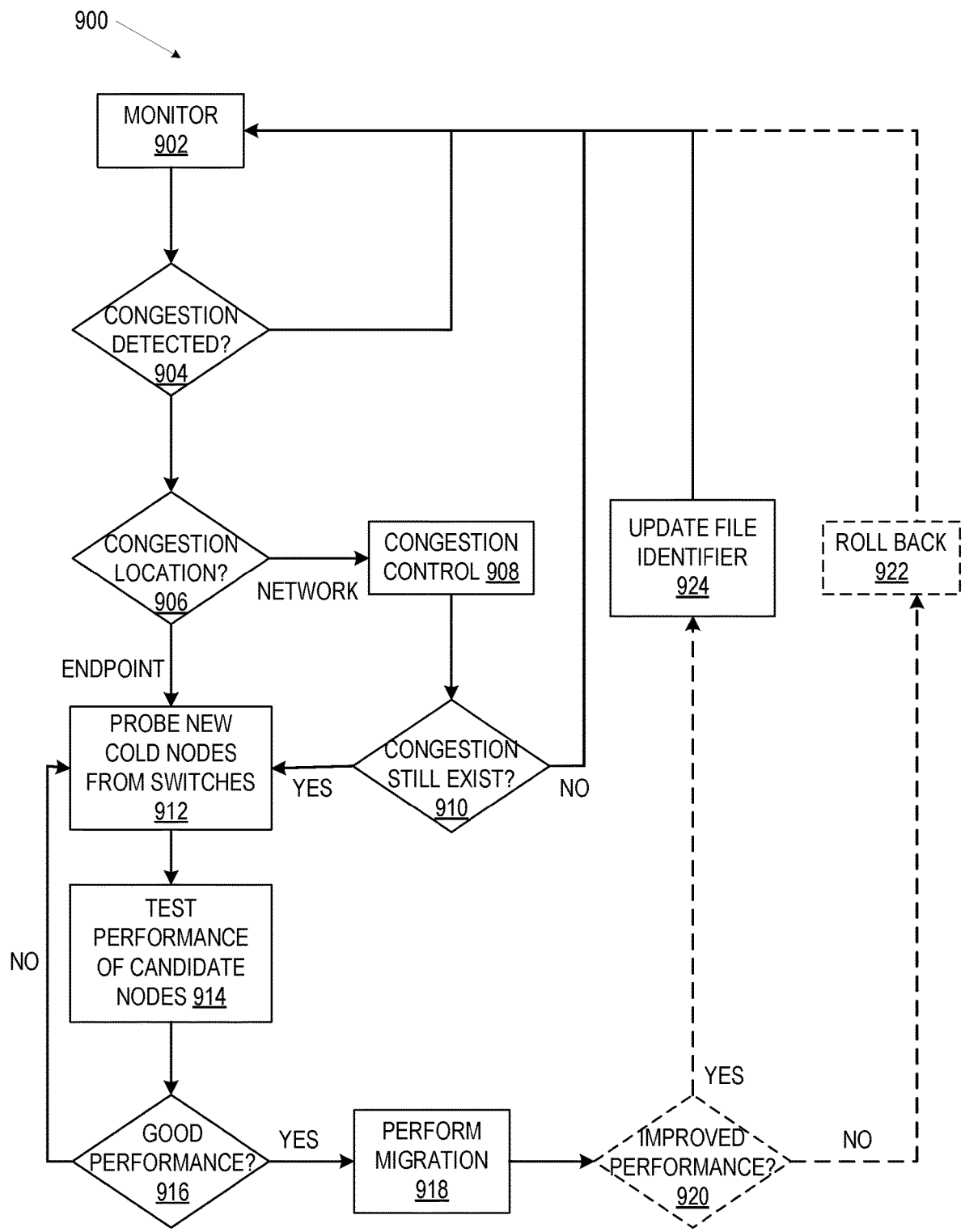
FIG. 9 shows a flow chart illustrating an example method for monitoring and resolving congestion of an autonomous network storage solution, which can be implemented by the example autonomous storage network of FIG. 2.

FIG. 9 shows a flow chart illustrating an example method for monitoring and resolving congestion of an autonomous network storage solution. At step 902, the method 900 includes monitoring for congestion level within the storage network. The monitoring process can be performed in various ways. In some implementations, the application node actively sends probing packets and determines congestion based on various factors such as but not limited to RTT.

At step 904, a determination of whether there is congestion detected is made. Congestion within the storage network can be detected through various methods. In some implementations, when a storage node becomes busy for a period of time that is more than a predetermined threshold (e.g., busy level*time), the storage node notifies the corresponding application nodes when read/write are performed. If no congestion is detected, the method 900 returns to step 902 of monitoring for congestion. If congestion is detected, a determination is made, at step 906, of the location of the congestion.

If the congestion is in the middle network, the method 900 includes, at step 908, performing a congestion control algorithm. Various types of congestion control can be implemented. In some implementations, a multi-path load balancer algorithm is implemented to remove congestion in the network upon determining that congestion on a given data path is above a predetermined threshold. A determination is then made, at step 910, of whether the congestion still exists. If not, the method 900 returns to step 902 of monitoring for congestion. If the congestion still exists, the method 900 includes, at step 912, probing cold storage nodes to determine candidate storage nodes for the migration process. An application node can probe for cold storage nodes in various ways. In some implementations, the application node sends cold storage node request(s) to the switches. The application node can also broadcast the request information. In response, the switches or the storage nodes return a list of candidate cold storage nodes (e.g., storage nodes with enough space and below a predetermined threshold hot level). In some implementations, the storage nodes send their hot/cold level periodically to the application nodes and the switches. As such, the application nodes and the switches record such information periodically. In the depicted example, the application node probes new cold storage nodes from a plurality of switches that have the information stored.

At step 914, the method 900 includes testing the performance of the candidate storage nodes (the new cold storage nodes probed in step 912). Testing the performance of candidate storage nodes can be performed in various ways. In some implementations, the application node sends probe packets to candidate storage node(s) to test network performance, such as RTT. The application node can also perform read/write testing on the candidate storage node(s). In some implementations, the application node simulates results after moving data from a hot storage node to a candidate cold storage node. Data can be copied from the hot storage node, or same sized dummy data can be used. Operations, such as read/write operations, can be simulated to test the candidate cold storage node based on various criteria, such as total bandwidth, time-to-completion (ToC), latency, tail latency, etc.

A determination is made, at step 916, of whether the candidate storage nodes perform well. If not, the method 900 returns to step 912 of probing for new cold storage nodes. If one or more of the candidate storage nodes perform well, the method 900 includes, at step 918, performing migration to migrate data associated with the congestion to a candidate storage node that performed well. The migration process can include migrating a file in the congested hot storage node to a candidate storage node that performed well. In some implementations, the file is kept on both storage nodes. For example, highly congested data, such as a file being accessed often, can be advantageously replicated among the storage nodes.

At step 920, the method 900 optionally includes determining whether the migrated file performs better than its previous location with the detected congestion. If not, the method 900 optionally includes, at step 922, rolling back the migration process. If the new performance is improved, the method 900 includes, at step 924, updating the file identifier. The file identifier can be updated in various ways. In some implementations, the application node updates the file information of the migrated file, including updating the file identifier, the storage node IP address, and/or the file offset. If the optional steps are skipped, the method 900 continues from step 918 of performing the migration process to step 924 of updating the file identifier of the migrated file. The method 900 then returns to step 902 of monitoring for congestion within the storage network.

Autonomous network architectures can be implemented in various ways. Storage nodes in an autonomous network architecture can be implemented such that each storage node has an agent that can monitor information of the storage node, such as storage capacity and congestion levels, and send the information to the application servers and the switches. Utilizing such information, an application node can make decisions and perform various functions without a centralized controller. For example, information from the storage nodes can be used by the application node to decide the storage node on which to store new file data, which can be determined based on the storage nodes' free storage capacity and/or congestion levels.

Information regarding the storage nodes received by the application node can also be used to perform data migration. In the example distributed storage networks described herein, data migration can be performed without a centralized controller. Each storage node and/or application node can determine whether to migrate the data, which can be dependent on various factors such as but not limited to congestion levels. The application node can probe the storage nodes independently without a controller to determine information about the storage nodes, such as performance levels and congestion levels. In some implementations, the application node attempts to solve a performance issue, such as through the use of network congestion control and flow control algorithms, before performing data migration. After data migration, affected applications and switches can be updated accordingly. The updates can be performed quickly since only a small number of applications and/or switches are to be updated (compared to traditional systems where all controller servers are updated). Furthermore, fast hierarchical searching can be performed due to the organizational schema of the storage network. In addition to data migration, discovery and meta data recovery schema without involvement of a centralized controller can also be implemented using the autonomous storage network architectures described herein.

In some embodiments, the methods and processes described herein may be tied to a computing system of one or more computing devices. In particular, such methods and processes may be implemented as a computer-application program or service, an application-programming interface (API), a library, and/or other computer-program product.

Figure 10:
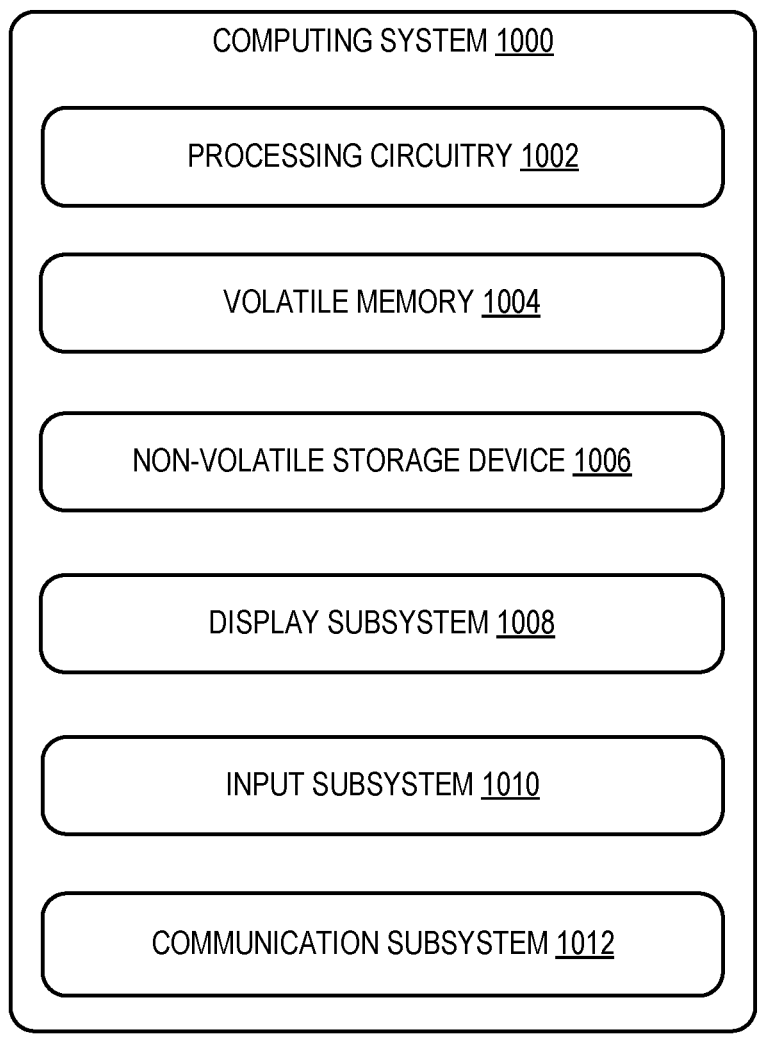
FIG. 10 shows a schematic view of an example computing environment, which can be implemented in the example autonomous storage network of FIG. 2.

FIG. 10 schematically shows a non-limiting embodiment of a computing system 1000 that can enact one or more of the methods and processes described above. Computing system 1000 is shown in simplified form. Components of computing system 1000 may be included in one or more personal computers, server computers, tablet computers, home-entertainment computers, network computing devices, video game devices, mobile computing devices, mobile communication devices (e.g., smartphone), and/or other computing devices, and wearable computing devices such as smart wristwatches and head mounted augmented reality devices.

Computing system 1000 includes processing circuitry 1002, volatile memory 1004, and a non-volatile storage device 1006. Computing system 1000 may optionally include a display subsystem 1008, input subsystem 1010, communication subsystem 1012, and/or other components not shown in FIG. 10.

Processing circuitry typically includes one or more logic processors, which are physical devices configured to execute instructions. For example, the logic processors may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors configured to execute software instructions. Additionally or alternatively, the logic processor may include one or more hardware logic circuits or firmware devices configured to execute hardware-implemented logic or firmware instructions. Processors of the processing circuitry 1002 may be single-core or multi-core, and the instructions executed thereon may be configured for sequential, parallel, and/or distributed processing. Individual components of the processing circuitry optionally may be distributed among two or more separate devices, which may be remotely located and/or configured for coordinated processing. For example, aspects of the computing system disclosed herein may be virtualized and executed by remotely accessible, networked computing devices configured in a cloud-computing configuration. In such a case, these virtualized aspects are run on different physical logic processors of various different machines, it will be understood. These different physical logic processors of the different machines will be understood to be collectively encompassed by processing circuitry 1002.

Non-volatile storage device 1006 includes one or more physical devices configured to hold instructions executable by the processing circuitry to implement the methods and processes described herein. When such methods and processes are implemented, the state of non-volatile storage device 1006 may be transformed—e.g., to hold different data.

Non-volatile storage device 1006 may include physical devices that are removable and/or built in. Non-volatile storage device 1006 may include optical memory, semiconductor memory, and/or magnetic memory, or other mass storage device technology. Non-volatile storage device 1006 may include nonvolatile, dynamic, static, read/write, read-only, sequential-access, location-addressable, file-addressable, and/or content-addressable devices. It will be appreciated that non-volatile storage device 1006 is configured to hold instructions even when power is cut to the non-volatile storage device 1006.

Volatile memory 1004 may include physical devices that include random access memory. Volatile memory 1004 is typically utilized by processing circuitry 1002 to temporarily store information during processing of software instructions. It will be appreciated that volatile memory 1004 typically does not continue to store instructions when power is cut to the volatile memory 1004.

Aspects of processing circuitry 1002, volatile memory 1004, and non-volatile storage device 1006 may be integrated together into one or more hardware-logic components. Such hardware-logic components may include field-programmable gate arrays (FPGAs), program- and application-specific integrated circuits (PASIC/ASICs), program- and application-specific standard products (PSSP/

ASSPs), system-on-a-chip (SOC), and complex programmable logic devices (CPLDs), for example.

The terms "module," "program," and "engine" may be used to describe an aspect of computing system 1000 typically implemented in software by a processor to perform a particular function using portions of volatile memory, which function involves transformative processing that specially configures the processor to perform the function. Thus, a module, program, or engine may be instantiated via processing circuitry 1002 executing instructions held by non-volatile storage device 1006, using portions of volatile memory 1004. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 1008 may be used to present a visual representation of data held by non-volatile storage device 1006. The visual representation may take the form of a GUI. As the herein described methods and processes change the data held by the non-volatile storage device, and thus transform the state of the non-volatile storage device, the state of display subsystem 1008 may likewise be transformed to visually represent changes in the underlying data. Display subsystem 1008 may include one or more display devices utilizing virtually any type of technology. Such display devices may be combined with processing circuitry 1002, volatile memory 1004, and/or non-volatile storage device 1006 in a shared enclosure, or such display devices may be peripheral display devices.

When included, input subsystem 1010 may comprise or interface with one or more user-input devices such as a keyboard, mouse, touch screen, camera, or microphone.

When included, communication subsystem 1012 may be configured to communicatively couple various computing devices described herein with each other, and with other devices. Communication subsystem 1012 may include wired and/or wireless communication devices compatible with one or more different communication protocols. As non-limiting examples, the communication subsystem may be configured for communication via a wired or wireless local- or wide-area network, broadband cellular network, etc. In some embodiments, the communication subsystem may allow computing system 1000 to send and/or receive messages to and/or from other devices via a network such as the Internet.

The following paragraphs provide additional description of the subject matter of the present disclosure. One aspect includes a network storage system for providing an autonomous network storage solution, the system comprising a first application node; a plurality of storage nodes; a switch fabric comprising a plurality of switches providing a plurality of data paths, each data path connecting the application node to a storage node of the plurality of storage nodes; and a control plane software agent implemented on the network storage system, wherein the control plane software agent configures the network storage system to receive, via the first application node, a request for storing a file; select a first storage node from the plurality of storage nodes; initialize a file identifier for the file based on a network topology of the switch fabric and the plurality of storage nodes, wherein the file identifier describes: the first storage node; a storage location in the first storage node; and a first data path of the plurality of data paths, wherein the first data path includes a first set of switches of the plurality of switches, the first set of switches connecting the first application node to the first storage node; and store the file on the first storage node. In this aspect, additionally or alternatively, the file identifier describes addresses of the first set of switches in a hierarchical format such that the file identifier can be parsed to retrieve the first data path. In this aspect, additionally or alternatively, the control plane software agent further configures the network storage system to receive, via the first application node, a request for accessing the stored file; and retrieve the stored file based on the file identifier. In this aspect, additionally or alternatively, retrieving the stored file comprises, upon determining that a congestion level of the first data path is below a predetermined level, retrieving the stored file using the first data path; and upon determining that the congestion level of the first data path is above the predetermined level, determining a second data path from the first application node to the first storage node, the second data path different from the first data path, and retrieving the stored file using the second data path. In this aspect, additionally or alternatively, determining the second path comprises probing a set of candidate data paths from the plurality of data paths, wherein the set of candidate data paths comprises the second data path; and selecting the second data path from the set of candidate data paths based on a congestion level of the second data path. In this aspect, additionally or alternatively, the control plane software agent further configures the network storage system to migrate the stored file to a second storage node. In this aspect, additionally or alternatively, migrating the stored file to the second storage node comprises determining that a congestion level of the first storage node is above a predetermined level; determining a set of candidate storage nodes from the plurality of storage nodes based on information describing congestion levels of the plurality of storage nodes, wherein the set of candidate storage nodes comprises the second storage node; selecting the second storage node from the set of candidate storage nodes based on a predetermined congestion level criterion; storing the file on the second storage node; and modifying the file identifier, wherein the modified file identifier describes the second storage node; a storage location in the second storage node; and a second data path of the plurality of data paths, wherein the second data path includes a second set of switches of the plurality of switches, the second set of switches connecting the first application node to the second storage node. In this aspect, additionally or alternatively, the plurality of switches store information describing congestion levels of the plurality of data paths and the plurality of storage nodes, wherein the second data path is determined based on the information stored in the plurality of switches. In this aspect, additionally or alternatively, for each of the plurality of storage nodes, a congestion level of the storage node is recorded on a respective set of switches of the plurality of switches, the respective set of switches connected to the storage node. In this aspect, additionally or alternatively, the system further comprises a second application node, wherein the control plane software agent further configures the network storage system to receive, via the second application node, a second request for storing a second file; initializing a second file identifier for the second file; and store the second file.

Another aspect includes method for providing an autonomous network storage solution, the method comprising receiving, via a first application node, a request for storing a file; selecting a first storage node from a plurality of storage nodes; initializing a file identifier for the file based on a network topology of a switch fabric and the plurality of storage nodes, wherein the switch fabric provides a plurality of data paths, each data path connecting the application node to a storage node of the plurality of storage nodes, and wherein the file identifier describes the first storage node; a storage location in the first storage node; and a first data path of the plurality of data paths, wherein the first data path includes a first set of switches of the plurality of switches, the first set of switches connecting the first application node to the first storage node; and storing the file on the first storage node. In this aspect, additionally or alternatively, the file identifier describes addresses of the first set of switches in a hierarchical format such that the file identifier can be parsed to retrieve the first data path. In this aspect, additionally or alternatively, the method further comprises receiving, via the first application node, a request for accessing the stored file; and retrieving the stored file based on the file identifier. In this aspect, additionally or alternatively, retrieving the stored file comprises, upon determining that a congestion level of the first data path is below a predetermined level, retrieving the stored file using the first data path; and upon determining that the congestion level of the first data path is above the predetermined level, determining a second data path from the first application node to the first storage node, the second data path different from the first data path, and retrieving the stored file using the second data path. In this aspect, additionally or alternatively, determining the second path comprises probing a set of candidate data paths from the plurality of data paths, wherein the set of candidate data paths comprises the second data path; and selecting the second data path from the set of candidate data paths based on a congestion level of the second data path. In this aspect, additionally or alternatively, the method further comprises migrating the stored file to a second storage node. In this aspect, additionally or alternatively, migrating the stored file to the second storage node comprises determining that a congestion level of the first storage node is above a predetermined level; determining a set of candidate storage nodes from the plurality of storage nodes based on information describing congestion levels of the plurality of storage nodes, wherein the set of candidate storage nodes comprises the second storage node; selecting the second storage node from the set of candidate storage nodes based on a predetermined congestion level criterion; storing the file on the second storage node; and modifying the file identifier, wherein the modified file identifier describes the second storage node; a storage location in the second storage node; and a second data path of the plurality of data paths, wherein the second data path includes a second set of switches of the plurality of switches, the second set of switches connecting the first application node to the second storage node. In this aspect, additionally or alternatively, the plurality of switches store information describing congestion levels of the plurality of data paths and the plurality of storage nodes, wherein the second data path is determined based on the information stored in the plurality of switches. In this aspect, additionally or alternatively, for each of the plurality of storage nodes, a congestion level of the storage node is recorded on a respective set of switches of the plurality of switches, the respective set of switches connected to the storage node.

Another aspect includes a network storage system for providing an autonomous network storage solution, the system comprising a first application node; a plurality of storage nodes; a switch fabric comprising a plurality of switches providing a plurality of data paths, each data path connecting the application node to a storage node of the plurality of storage nodes; and a control plane software agent implemented on the network storage system, wherein the control plane software agent configures the network storage system to receive, via the first application node, a request for accessing a file, wherein the file is associated with a globally unique file identifier describing a first storage node; a storage location in the first storage node; and a first data path of the plurality of data paths, wherein the first data path connects the first application node to the first storage node; and retrieve the file from a first storage node of the plurality of storage nodes based on the globally unique file identifier.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A network storage system for providing an autonomous network storage solution, the system comprising:
   a first application node;
   a plurality of storage nodes;
   a switch fabric comprising a plurality of switches providing a plurality of data paths, each data path connecting the application node to a storage node of the plurality of storage nodes; and
   a control plane software agent implemented on the network storage system, wherein the control plane software agent configures the network storage system to:
      receive, via the first application node, a request for storing a file;
      select a first storage node from the plurality of storage nodes;
      initialize a file identifier for the file based on a network topology of the switch fabric and the plurality of storage nodes, wherein the file identifier describes:
         the first storage node;
         a storage location in the first storage node; and
         a first data path of the plurality of data paths, wherein the first data path includes a first set of switches of the plurality of switches, the first set of switches connecting the first application node to the first storage node; and
      store the file on the first storage node.

2. The network storage system of claim 1, wherein the file identifier describes addresses of the first set of switches in a hierarchical format such that the file identifier can be parsed to retrieve the first data path.

3. The network storage system of claim 1, wherein the control plane software agent further configures the network storage system to:
   receive, via the first application node, a request for accessing the stored file; and
   retrieve the stored file based on the file identifier.

4. The network storage system of claim 3, wherein retrieving the stored file comprises:

upon determining that a congestion level of the first data path is below a predetermined level, retrieving the stored file using the first data path; and
upon determining that the congestion level of the first data path is above the predetermined level:
determining a second data path from the first application node to the first storage node, the second data path different from the first data path; and
retrieving the stored file using the second data path.

5. The network storage system of claim 4, wherein determining the second path comprises:
probing a set of candidate data paths from the plurality of data paths, wherein the set of candidate data paths comprises the second data path; and
selecting the second data path from the set of candidate data paths based on a congestion level of the second data path.

6. The network storage system of claim 4, wherein the plurality of switches store information describing congestion levels of the plurality of data paths and the plurality of storage nodes, wherein the second data path is determined based on the information stored in the plurality of switches.

7. The network storage system of claim 1, wherein the control plane software agent further configures the network storage system to:
migrate the stored file to a second storage node.

8. The network storage system of claim 7, wherein migrating the stored file to the second storage node comprises:
determining that a congestion level of the first storage node is above a predetermined level;
determining a set of candidate storage nodes from the plurality of storage nodes based on information describing congestion levels of the plurality of storage nodes, wherein the set of candidate storage nodes comprises the second storage node;
selecting the second storage node from the set of candidate storage nodes based on a predetermined congestion level criterion;
storing the file on the second storage node; and
modifying the file identifier, wherein the modified file identifier describes:
the second storage node;
a storage location in the second storage node; and
a second data path of the plurality of data paths, wherein the second data path includes a second set of switches of the plurality of switches, the second set of switches connecting the first application node to the second storage node.

9. The network storage system of claim 1, wherein, for each of the plurality of storage nodes, a congestion level of the storage node is recorded on a respective set of switches of the plurality of switches, the respective set of switches connected to the storage node.

10. The network storage system of claim 1, further comprising a second application node, wherein the control plane software agent further configures the network storage system to:
receive, via the second application node, a second request for storing a second file;
initializing a second file identifier for the second file; and store the second file.

11. A method for providing an autonomous network storage solution, the method comprising:
receiving, via a first application node, a request for storing a file;
selecting a first storage node from a plurality of storage nodes;
initializing a file identifier for the file based on a network topology of a switch fabric and the plurality of storage nodes, wherein the switch fabric provides a plurality of data paths, each data path connecting the application node to a storage node of the plurality of storage nodes, and wherein the file identifier describes:
the first storage node;
a storage location in the first storage node; and
a first data path of the plurality of data paths, wherein the first data path includes a first set of switches of the plurality of switches, the first set of switches connecting the first application node to the first storage node; and
storing the file on the first storage node.

12. The method of claim 11, wherein the file identifier describes addresses of the first set of switches in a hierarchical format such that the file identifier can be parsed to retrieve the first data path.

13. The method of claim 11, further comprising:
receiving, via the first application node, a request for accessing the stored file; and
retrieving the stored file based on the file identifier.

14. The method of claim 13, wherein retrieving the stored file comprises:
upon determining that a congestion level of the first data path is below a predetermined level, retrieving the stored file using the first data path; and
upon determining that the congestion level of the first data path is above the predetermined level:
determining a second data path from the first application node to the first storage node, the second data path different from the first data path; and
retrieving the stored file using the second data path.

15. The method of claim 14, wherein determining the second path comprises:
probing a set of candidate data paths from the plurality of data paths, wherein the set of candidate data paths comprises the second data path; and
selecting the second data path from the set of candidate data paths based on a congestion level of the second data path.

16. The method of claim 14, wherein the plurality of switches store information describing congestion levels of the plurality of data paths and the plurality of storage nodes, wherein the second data path is determined based on the information stored in the plurality of switches.

17. The method of claim 11, further comprising migrating the stored file to a second storage node.

18. The method of claim 17, wherein migrating the stored file to the second storage node comprises:
determining that a congestion level of the first storage node is above a predetermined level;
determining a set of candidate storage nodes from the plurality of storage nodes based on information describing congestion levels of the plurality of storage nodes, wherein the set of candidate storage nodes comprises the second storage node;
selecting the second storage node from the set of candidate storage nodes based on a predetermined congestion level criterion;
storing the file on the second storage node; and
modifying the file identifier, wherein the modified file identifier describes:
the second storage node;
a storage location in the second storage node; and a second data path of the plurality of data paths, wherein the second data path includes a second set of switches of the plurality of switches, the second set of switches connecting the first application node to the second storage node.

19. The method of claim 11, wherein, for each of the plurality of storage nodes, a congestion level of the storage node is recorded on a respective set of switches of the plurality of switches, the respective set of switches connected to the storage node.

20. A network storage system for providing an autonomous network storage solution, the system comprising:
- a first application node;
- a plurality of storage nodes;
- a switch fabric comprising a plurality of switches providing a plurality of data paths, each data path connecting the application node to a storage node of the plurality of storage nodes; and
- a control plane software agent implemented on the network storage system, wherein the control plane software agent configures the network storage system to:
  - receive, via the first application node, a request for accessing a file, wherein the file is associated with a globally unique file identifier describing:
    - a first storage node;
    - a storage location in the first storage node; and
    - a first data path of the plurality of data paths, wherein the first data path connects the first application node to the first storage node; and
  - retrieve the file from a first storage node of the plurality of storage nodes based on the globally unique file identifier.

* * * * *